United States Patent
Khouri et al.

(10) Patent No.: US 7,356,605 B1
(45) Date of Patent: Apr. 8, 2008

(54) SYSTEM AND METHOD FOR CONTROLLING DELIVERY OF STREAMING MEDIA

(75) Inventors: Joseph F. Khouri, San Jose, CA (US); Shmuel Shaffer, Palo Alto, CA (US); Robert T. Bell, Bountiful, UT (US)

(73) Assignee: Cisco Technology, Inc., San Jose, CA (US)

( * ) Notice: Subject to any disclaimer, the term of this patent is extended or adjusted under 35 U.S.C. 154(b) by 872 days.

(21) Appl. No.: 09/751,627

(22) Filed: Dec. 29, 2000

(51) Int. Cl.
*G06F 15/16* (2006.01)

(52) U.S. Cl. ............................................. 709/232

(58) Field of Classification Search ............ 709/231, 709/232; 710/52; 370/412; 379/88.7
See application file for complete search history.

(56) References Cited

U.S. PATENT DOCUMENTS

| | | | | |
|---|---|---|---|---|
| 5,764,235 A * | 6/1998 | Hunt et al. | ........... | 345/428 |
| 5,822,537 A * | 10/1998 | Katseff et al. | ........... | 709/231 |
| 5,917,822 A * | 6/1999 | Lyles et al. | ........... | 370/395.4 |
| 6,005,599 A * | 12/1999 | Asai et al. | ........... | 725/116 |
| 6,028,842 A * | 2/2000 | Chapman et al. | ........... | 370/235 |
| 6,084,919 A * | 7/2000 | Kleider et al. | ........... | 375/285 |
| 6,091,947 A * | 7/2000 | Sumner | ........... | 455/413 |
| 6,185,221 B1 * | 2/2001 | Aybay | ........... | 370/412 |
| 6,185,625 B1 * | 2/2001 | Tso et al. | ........... | 709/247 |
| 6,223,153 B1 * | 4/2001 | Bowater et al. | ........... | 704/219 |
| 6,269,078 B1 * | 7/2001 | Lakshman et al. | ........... | 370/230 |
| 6,301,258 B1 * | 10/2001 | Katseff et al. | ........... | 370/412 |
| 6,356,545 B1 * | 3/2002 | Vargo et al. | ........... | 370/355 |
| 6,374,225 B1 * | 4/2002 | Hejna, Jr. | ........... | 704/270 |
| 6,445,696 B1 * | 9/2002 | Foodeei et al. | ........... | 370/356 |
| 6,469,737 B1 * | 10/2002 | Igarashi et al. | ........... | 348/211.3 |
| 6,522,730 B1 * | 2/2003 | Timm et al. | ........... | 379/93.08 |
| 6,553,568 B1 * | 4/2003 | Fijolek et al. | ........... | 725/111 |
| 6,580,694 B1 * | 6/2003 | Baker | ........... | 370/252 |
| 6,603,774 B1 * | 8/2003 | Knappe et al. | ........... | 370/466 |
| 6,625,655 B2 * | 9/2003 | Goldhor et al. | ........... | 709/231 |
| 6,625,656 B2 * | 9/2003 | Goldhor et al. | ........... | 709/231 |
| 6,643,259 B1 * | 11/2003 | Borella et al. | ........... | 370/231 |
| 6,665,728 B1 * | 12/2003 | Graumann et al. | ........... | 709/232 |
| 6,665,751 B1 * | 12/2003 | Chen et al. | ........... | 710/52 |
| 6,671,292 B1 * | 12/2003 | Haartsen | ........... | 370/521 |
| 6,683,889 B1 * | 1/2004 | Shaffer et al. | ........... | 370/516 |
| 6,697,356 B1 * | 2/2004 | Kretschmer et al. | ........... | 370/352 |
| 6,741,705 B1 * | 5/2004 | Nelson et al. | ........... | 380/257 |
| 6,757,367 B1 * | 6/2004 | Nicol | ........... | 379/90.01 |
| 6,785,379 B1 * | 8/2004 | Rogers et al. | ........... | 379/265.02 |
| 6,791,579 B2 | 9/2004 | Markel | ........... | 345/719 |

(Continued)

OTHER PUBLICATIONS

Held, G., High Spped Digital Transmission Networking, 2nd Ed., John Wiley & Sons, Ltd., pp. 47-72, 1999.*

*Primary Examiner*—Andrew Caldwell
*Assistant Examiner*—Michael D. Meucci
(74) *Attorney, Agent, or Firm*—Baker Botts L.L.P.

(57) ABSTRACT

A system and method for controlling delivery of streaming media include the capability to receive streaming media at an endpoint device at a first delivery rate and at the endpoint device, determine whether to adjust the first delivery rate and generate a command to adjust the first delivery rate. The system and method further include the capability to receive the command at a media delivery system and stream subsequent media at the adjusted rate.

59 Claims, 5 Drawing Sheets

U.S. PATENT DOCUMENTS

| | | | |
|---|---|---|---|
| 6,801,964 B1 | 10/2004 | Mahdavi | 710/35 |
| 6,802,019 B1 | 10/2004 | Lauder | 713/400 |
| 6,804,244 B1 * | 10/2004 | Anandakumar et al. | 370/395.21 |
| 6,816,909 B1 | 11/2004 | Chang et al. | 709/231 |
| 2002/0080886 A1 * | 6/2002 | Ptasinski et al. | 375/295 |
| 2002/0089931 A1 * | 7/2002 | Takada et al. | 370/232 |
| 2002/0105932 A1 * | 8/2002 | Miya | 370/338 |
| 2002/0114285 A1 * | 8/2002 | LeBlanc | 370/252 |
| 2004/0045030 A1 * | 3/2004 | Reynolds et al. | 725/110 |
| 2004/0160979 A1 * | 8/2004 | Pepin et al. | 370/462 |
| 2005/0201414 A1 * | 9/2005 | Awais | 370/468 |

* cited by examiner

SYSTEM AND METHOD FOR CONTROLLING DELIVERY OF STREAMING MEDIA

TECHNICAL FIELD OF THE INVENTION

This invention relates generally to the delivery of electronic media and, more specifically, to a system and method for controlling delivery of streaming media.

BACKGROUND OF THE INVENTION

Voice mail systems receive, store, and retrieve voice messages for called parties. Voice messages are stored to and retrieved from disk, electronic, or other storage media. The messages are streamed to the user as they are retrieved.

Voice mail systems are often centralized in a network to allow efficient access by users. Such systems rely on centralized processors to change the playback speed of the voice stream while minimizing variation to the speech characteristics. As the voice stream is played faster, the centralized control reads the voice message faster from media storage to maintain a steady flow of the voice stream and processes the voice message to ameliorate any deleterious changes due to the faster playback. Such reliance on centralized processor resources, however, is often not practical for modern voice over Internet protocol (VoIP) systems.

SUMMARY OF THE INVENTION

The present invention provides an improved system and method for controlling the delivery of voice messages and other streaming media. In particular, in certain embodiments, the present invention provides a system and method that allow the rate at which streaming media is being delivered to be controlled based on the rate at which the media is being converted into output by a media output device.

In particular embodiments, the present invention provides an endpoint device for controlling the delivery of streaming media. In certain embodiments, the endpoint device includes a communication network interface operable to receive streaming media from a network device at a first delivery rate. The endpoint device also includes a memory coupled to the communication network interface. The memory has the ability to store media received through the communication network interface. The endpoint device further includes a media rate controller coupled to the memory and the communication network interface. The controller has the ability to determine an adjustment to the first delivery rate and generate a command for the network device to change the first delivery rate in accordance with the adjustment.

In some embodiments, the present invention provides a method for controlling the delivery of streaming media at an endpoint device. In certain embodiments, the method includes receiving streaming media at an endpoint device at a first delivery rate, storing the received media, and determining whether to adjust the first delivery rate. The method also includes determining an adjustment to the first delivery rate if an adjustment is desired and generating a command for a network device to change the first delivery rate in accordance with the adjustment.

In several embodiments, the present invention includes digital signal processing (DSP) functionality at the endpoint device. The DSP functionality allows the endpoint device to generate output at varying rates based on received media while minimizing any effects to the original qualities of the information represented by the media caused by the variation in rate. For example, for data that represents audible sounds, the DSP functionality may allow audible sounds to be output at a slower or faster rate while maintaining voice quality, such as, for example, minimizing frequency shifts in the audible sounds. Thus, in these embodiments, the invention creates a distributed system for controlling the rate at which media is transferred to the endpoint device while relying on DSP techniques at the endpoint device to ameliorate any deleterious effects of the increased rate.

In some embodiments, the present invention provides a system for delivering streaming media. In particular embodiments, the system includes a communication network interface operable to send streaming media to a communication network and a memory coupled to the communication network interface, the memory including at least one file containing media. The system also includes a delivery controller coupled to the memory and the communication network interface. The delivery controller has the ability to detect a command to send the media from the file through the communication network interface to an endpoint device, retrieve the media from the file and format it into packets, and stream the packets through the communication network interface at a determined rate.

Technical advantages of the present invention include providing an improved method and system for controlling the delivery of voice messages and other streaming media. In a particular embodiment, endpoint devices communicate with central media storage to control the delivery rate of the streaming media. Accordingly, processing requirements are distributed to the edge of the network. The distributed system provides improved scalability and maintains backward compatibility with existing storage systems.

Another technical advantage of the present invention includes providing an improved voice over Internet protocol (VoIP) communication device. In a particular embodiment, a VoIP phone or softphone monitors the delivery rate of the media relative to its consumption rate and automatically communicates with a media delivery system to control delivery. As a result, the device can optimize performance.

The present invention has several other technical features and advantages. For example, in particular embodiments, the rate at which media is being delivered to a media output device is adjusted based on the rate at which a user of the media output device wants to have output generated based on the delivered media. Thus, a user of the media output device may adjust the rate at which she receives output based on the media without starving or overflowing the media output device. As another example, in certain embodiments, a buffer of a media output device is monitored to determine whether the status of the media at the media output device is appropriate for generating output based on the media, and the rate at which the media is being delivered is adjusted if the status of the media in the buffer is unsatisfactory. Thus, the media delivery rate is automatically adjusted to ensure that the media output device does not starve or overflow. As an additional example, in some embodiments, the rate at which the media is being delivered to the media output device is adjusted by changing the amount of media in each packet sent to the media output device and/or by changing the rate at which the packets containing media are sent to the media output device. Thus, the adjustment of the rate at which media is delivered to the media output device may accommodate different communication system conditions. As a further example, in certain embodiments, a reservation may be made and/or adjusted in the communication network used to deliver the media when a new media delivery rate is required. Thus, the media delivery rate may be adjusted with some confidence that the required network bandwidth will be available to deliver the adjusted media rate.

Some embodiments may possess none, one, some, or all of these technical features and advantages and/or additional technical features and advantages. Other technical features and advantages will be readily apparent to one of skill in the art from the following figures, description, and claims.

BRIEF DESCRIPTION OF THE DRAWINGS

To provide a more complete understanding of the present invention, especially when considered in light of the following written description, and to further illuminate its technical features and advantages, reference is now made to the following drawings, in which.

DETAILED DESCRIPTION OF THE INVENTION

Figure 1:
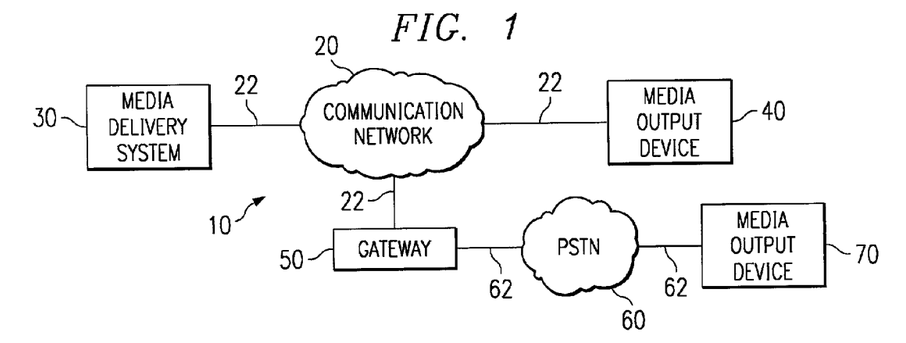
FIG. 1 illustrates one embodiment of a communication system for delivering streaming media.

FIG. 1 illustrates one embodiment of a communication system 10 for delivering streaming media. Streaming media includes digital representations of text, graphics, video, animation, and/or sound. In general, communication system 10 includes a communication network 20, a media delivery system 30, and a media output device 40. Communication network 20 is coupled to media delivery system 30 by one of communication links 22 and to media output device 40 by one of communication links 22. Communication network 20 is operable to relay information between media delivery system 30 and media output device 40. Media delivery system 30 is a network device operable to store the media and to send the media to communication network 20 for delivery to media output device 40. Media output device 40, in turn, is operable to receive the media through communication network 20 and convert the media into a form that is intelligible to a user of media output device 40. Furthermore, media output device 40 is operable to specify a rate at which the media should be delivered and/or an adjustment to the rate at which media is currently being delivered, and media delivery system 30 is operable to send the media to communication network 20 at the adjusted rate. Thus, in general, communication system 10 is operable to transfer media stored at one point to another point at different rates and convert it into a form that is intelligible to a user.

In operation, when a user of media output device 40 requests media, media output device 40 initiates a connection with media delivery system 20 for the delivery of the media. During this initiation, media output device 40 may determine whether media delivery system 30 is a computerized delivery system and, if it is, determine the capabilities of media delivery system 30. Media output device 40 may use any of a variety of protocols to make these determinations, such as, for example, H.3.3. If media output device 40 determines that media delivery system 30 only supports one rate for media delivery, media output device 40 will operate using that media delivery rate. If, however, media output device 40 determines that media delivery system 30 supports multiple rates for media delivery, media output device 40 may attempt to operate using multiple media delivery rates.

After completing the initiation sequence, media output device 40 sends a request for media to media delivery system 30 through communication network 20. In response to receiving the request from media output device 40, media delivery system 30 determines whether the requested media is available and informs media output device 40 once the media is available for delivery. After determining the rate at which the media is to be delivered, media delivery system 30 begins to stream the media at the first rate. Media delivery system 30 may accomplish this by selecting a portion of the requested media, formatting the portion into a plurality of packets, each packet containing part of the selected portion, and sending the packets to communication network 20. For example, the amount of media in a file may be on the order of a few megabytes, and media delivery system 30 may select a portion of the file that is on the order of a few kilobytes and form a group of packets that each contain on the order of a few one-hundred bytes of media from the portion. The first rate may be a default value stored by media delivery system 30, a default value stored by media output device 40, a value determined by media output device 40 based on the rate at which media is to be consumed, or any other appropriate indicator of media delivery rate. Communication network 20, in turn, routes the packets to media output device 40. Upon receiving the packets from communication network 20, media output device 40 generates output that is intelligible to a user of media output device 40 based on the media in the packets.

Typically, media delivery system 30 sends multiple packets containing media to media output device 40 to deliver all of the requested media. Thus, by monitoring the amount of media in each packet and the rate at which the packets are sent, the rate at which media delivery system 30 is providing the media may be determined.

In another mode of operation, media output device 40 determines that it needs to receive subsequent media from the requested file at a different rate. Accordingly, media output device 40 determines an adjustment to the rate at which the media is currently being delivered, generates a command specifying the adjustment to the rate, and sends this command to media delivery system 30. The command may be sent in-band, out-of-band, as a unique message, as a modification to a standard message, or through any other appropriate manner. Furthermore, the command may specify an increase in the current delivery rate, a decrease in the current delivery rate, the desired rate, if media output device 40 computes the rate, or any other appropriate adjustment to the current media delivery rate. Upon receiving this command, media delivery system 30 changes the rate at which it is sending the media from the requested file to communication network 20 and, consequently, media output device 40.

In the illustrated embodiment, communication system 10 also includes a gateway 50, a public switched telephone network (PSTN) 60, and a media output device 70. Gateway 50 is coupled to communication network 20 by one of communication links 22 and to PSTN 60 by one of PSTN links 62. Media output device 70 is also coupled to PSTN 60 by one of PSTN links 62. Gateway 50 is operable to convert electronic signals from communication network 20 into a form appropriate for PSTN 60 and to convert electronic signals from PSTN 60 into a form appropriate for communication network 20. Media output device 70 is operable to generate output intelligible to a user based on electronic signals from PSTN 60.

In operation, media output device 70, like media output device 40, may request media from media delivery system 30. In this case, however, the request from media output device 70 is first sent to gateway 50. Gateway 50 then initiates a connection with media delivery system 30 for the delivery of the media. In the initiation sequence, gateway 50, as media output device 40 did, may determine what type of device media delivery system 30 is and what capabilities media delivery system 30 possesses. After completing the initiation sequence, gateway 50 sends a media delivery request appropriate for media delivery system 30. As before, upon receiving the request for media, media delivery system 30 determines whether the requested media is available and sends a message once it is ready to deliver the media. After determining the rate at which media is to be delivered, for example, by determining a default value, receiving a value, or otherwise, media delivery system 30 selects a portion of the requested media, packetizes the portion, and sends the packets to communication network 20. Communication network 20 routes the packets to gateway 50. Upon receiving the formatted media, gateway 50 converts the packets into a format appropriate for PSTN 60. Then, gateway 50 sends the converted media to media output device 70 through PSTN 60. As used herein, formatted media comprises packetized media. Upon receiving the converted media, media output device 70 generates output that is intelligible to a user of media output device 70 based on the converted media. Thus, gateway 50 allows media output device 70 to receive media from media delivery system 30.

In another mode of operation, gateway 50 determines that it needs to receive subsequent media from the media file at a different rate. Accordingly, gateway 50 may determine an adjustment to the rate at which the media is being delivered, generate a command specifying the adjustment to the rate, and send this command to media delivery system 30. The command may be sent in-band, out-of-band, as a unique message, as a modification to a standard message, or through any other appropriate manner. Furthermore, the command may specify an increase in the current delivery rate, a decrease in the current delivery rate, the desired rate, if gateway 50 determines a rate at which the subsequent media from the file should be delivered, or any other appropriate adjustment to the current delivery rate. Upon receiving this command, media delivery system 30 adjusts the rate at which it is sending the media to communication network 20 and, consequently, gateway 50. Gateway 50 may then process the media based on the new delivery rate for media output device 70 and send the processed media to media output device 70 through PSTN 60 at a rate dictated by PSTN 60.

The components of communication system 10 may have a variety of forms. Communication network 20 may be an asynchronous transport mode (ATM) network, a packet switched network, a frame relay network, a wave division multiplexing (WDM) network, or any other type of system for transferring information from one point to another point. In a particular embodiment communication network 20 is the Internet. Communication links 22 may be twisted pair wire, fiber optic cable, wireless channels, and/or any other type of medium for transferring a signal from one point to another point. Media delivery system 30 may be a video storage and delivery system, voice mail storage and delivery system, or any other type of system that stores and delivers media. Media delivery system 30 and the components of communication network 20 are often referred to as "network devices." Media output device 40 may be a personal computer, a softphone, a personal digital assistant (PDA), a cellular telephone, a video viewing terminal, or any other type of endpoint device that can determine an adjustment to the rate at which media is being delivered to it, generate a command specifying the adjustment to the current delivery rate, and generate output based on the received media. Media output device 70 may be a personal computer, a telephone, a softphone, a PDA, a cellular telephone, a video viewing terminal, or any other type of endpoint device that can generate output based on received media. In general, some of the operations of media output device 40 reside in gateway 50, as discussed below.

Figure 2A:
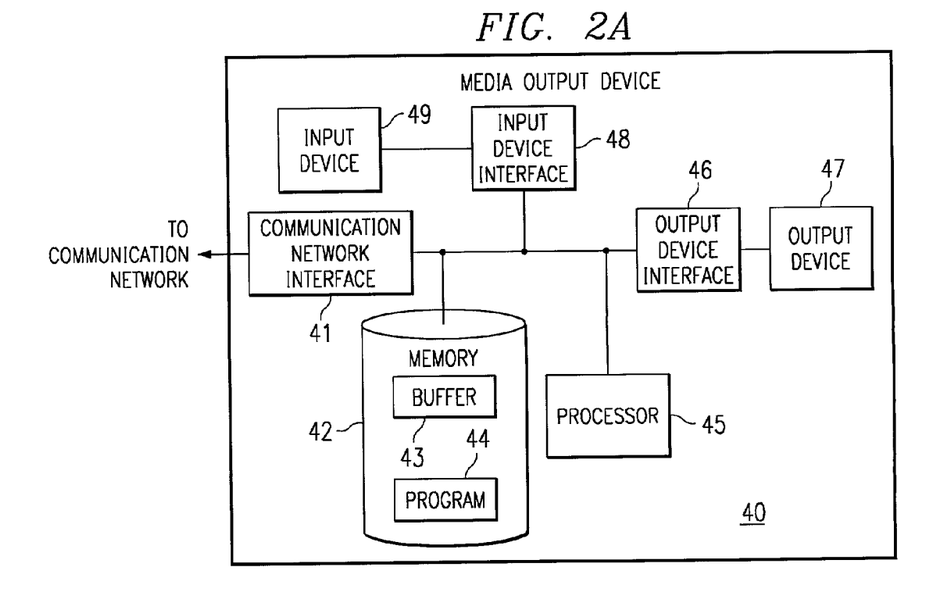
FIG. 2A shows a detailed view of one embodiment of a media output device for the system of FIG. 1.

FIG. 2A shows a detailed view of one embodiment of media output device 40 for communication system 10. In general, media output device 40 includes a memory 42 coupled to a processor 45 and an output device 47. In operation, memory 42 stores the media received from communication network 20, and processor 45 converts the media into a format appropriate for output device 47. Output device 47, in turns, generates output that is intelligible to a user of media output device 40 based on the converted media.

In more detail, media output device 40 includes a communication network interface 41 that is adapted to couple to communication network 20. Communication network interface 41 is operable to send information to and receive information, including media, from communication network 20. Coupled to communication network interface 41 is memory 42. Memory 42 includes a buffer 43, which stores the media received from communication network 20 through communication network interface 41, and a program 44, which contains a set of logic for processor 45. Processor 45 may access the logic in program 44 in order to perform operations on the media in buffer 43. Also coupled to memory 42 is an output device interface 46. Output device interface 46 is operable to receive media from memory 42 and/or processor 45 and convert the received media into signals appropriate for output device 47. Output device 47 is coupled to output device interface 46 and is operable to receive the signals from output device interface 46 and generate output intelligible to a user of media output device 40. Media output device 40 also includes an input device 49, which is operable to detect commands from a user of media output device 40 and generate signals representative of the commands, such as, for example, slowing down or speeding up the output based on the media. Coupled to input device 49 is an input device interface 48, which is operable to receive the signals representative of the commands from input device 49 and convert them to a form appropriate for processor 45.

In operation, when media output device 40 is to generate output, processor 45 performs an initiation sequence and then generates a request to deliver media and sends the request through communication network interface 41. After receiving a message indicating that media delivery is available, processor 45 generates a command to deliver the requested media at a first rate and sends the command through communication network interface 41. Upon receiving the media, from media delivery system 30 in FIG. 1, communication network interface 41 performs any necessary conversions to the media, such as, for example, removing media access control headers and protocols from the received media, and forwards the media to buffer 43 of memory 42. Processor 45 periodically checks memory 42 to determine whether any media is present in buffer 43. If media is present in buffer 43, processor 45, by using digital signal processing (DSP) techniques on the media and/or placing the media into an appropriate format, converts the media into a form useful by output device interface 46 and facilitates the transfer of the converted media to output device interface 46, such as, for example, by specifying the location of the media in memory 42. Output device interface 46 receives the converted media and generates appropriate signals based on the converted media. Then, output device interface 46 forwards the signals to output device 47, which generates output that is intelligible to a user of media output device 40.

In another mode of operation, processor 45 monitors buffer 43 of memory 42 to determine whether the status of the media in buffer 43 is satisfactory. The factors used in determining the status could include the amount of media in buffer 43, the rate of media delivery to buffer 43, and/or the rate of media consumption from buffer 43. For example, if media output device 40 is rapidly consuming media and the amount of media in buffer 43 is small, sixty-four kilobits, for example, media output device 40 may determine that the amount of media in buffer 43 is unsatisfactory. Contrarily, if media output device 40 is slowly consuming media and the amount of media in buffer 43 is high, the amount of media in buffer 43 may be satisfactory. Of course, if the amount of media in buffer 43 becomes too high, buffer 43 may overflow, which is unsatisfactory. If processor 45 only monitors the amount of media in buffer 43, it is behaving as a zero order controller, and if processor 45 monitors the amount of media in the buffer, the rate of media delivery, and the rate of media consumption, it is behaving as a first order controller. A variety of operations for ensuring the proper operation, or optimization, of buffer 43 are well known to those skilled in the art.

If processor 45 detects that the amount of media in buffer 43 is unsatisfactorily low, processor 45 generates a command to increase the rate at which the media is being delivered and sends this command through communication network interface 41. In the converse, if processor 45 detects that the amount of media in buffer 43 is too high, processor 45 generates a command to decrease the rate at which the media is being delivered and sends this command through communication network interface 41. Thus, processor 45 may adjust the rate at which media is delivered to media output device 40 to ensure that buffer 43 does not starve or overflow.

In still another mode of operation, input device 49 detects a command to change the rate at which output is being generated by output device 47. Upon receiving this command, input device 49 sends a signal representative of the command to input device interface 48, which converts the signal into a format useful by processor 45. Upon receiving this command, processor 45 changes the rate at which output is being generated by output device 47, generates a command to adjust the rate at which the media is being delivered to media output device 40, and sends the command through communication network interface 41. Accordingly, processor 45 may adjust the rate at which media is delivered to media output device 40 in accordance with the rate at which a user desires output generated based on the media. Note, in embodiments where the media represents audible sounds, processor 45 may have to use DSP techniques on the media used to generate output at the new rate to maintain appropriate sound quality.

In still a further mode of operation, processor 45 may generate a command specifying an amount of bandwidth to be reserved in communication network 20. Processor 45 would use the rate at which media is to be delivered through communication network 20 to determine the amount of bandwidth to request in the command. By issuing this command, media output device 40 would ensure that an appropriate amount of bandwidth would be available through communication network 20 for the delivery of the media at the specified rate. The command to reserve the bandwidth in communication network 20 may be formatted in Resource Reservation Setup Protocol (RSVP), Committed Information Rate (CIR) protocol, or any other format that will allow bandwidth to be reserved in communication network 20.

The components of media output device 40 may have a variety of different forms. Communication network interface 41 may be a network interface card, such as, for example, an Ethernet card, an optical transceiver, a radio frequency transceiver, or any other type of device that can send and receive information. Memory 42 may be random access memory (RAM), compact-disc read-only memory (CD-ROM), or any other type of electromagnetic or optical volatile or non-volatile device for storing information. Note, the received media in memory 42 may be stored in any manner in memory 42 as long as the received media may be located. Processor 45 may be a complex instruction set computer (CISC), a reduced instruction set computer (RISC), or any other type of device for manipulating electronic information. In particular embodiments, some or all of program 44 may be encoded on processor 45. Output device 47 may be a sound card, a video graphics adapter card, or any other type of device for converting media into an appropriate form for output device 47. Output device 47 may be a speaker, a cathode ray tube (CRT) monitor, a liquid crystal display (LCD), or any other type of device that can generate output that is intelligible to a user based on signals from output device interface 46. Input device 49 may be a mouse, a keyboard, a voice responsive system, or any other type of device for detecting a command from a user of media output device 40. Input device interface 48 may be any type of device for receiving a signal representing a command from input device 49 and converting the signal into a form acceptable to processor 45. Other components, configurations, and distributions of operations for media output device 40 will be readily suggested to those skilled in the art.

In particular embodiments, the media desired by media output device 40 may represent audible sounds, and media output device 40 may format the request to deliver the media using DTMF signaling. Additionally, media output device 40 may receive the media as Internet protocol (IP) packets using transfer control protocol (TCP). Moreover, the media may be encoded using G.711, G.723, G.729, MP3, or any other type of encoding scheme. Thus, for example, media output device 40 may convert the received media from IP packets with G.711 encoding into a useable format, such as Musical Instrument Digital Interface (MIDI), Sound Blaster, or any other format for producing audible sounds from their digital representations. Media output device 40 may also generate analog signals representative of audible sounds based on the converted media using a sound card. Media output device 40 may then generate audible sounds based on the analog signals by using a speaker. A variety of other formats for communicating between media output device 40 and media delivery system 30, for encoding audible sounds, and for generating audible sounds exist. It will be understood that movies and other video may be similarly delivered using suitable protocols and coding.

Figure 2B:
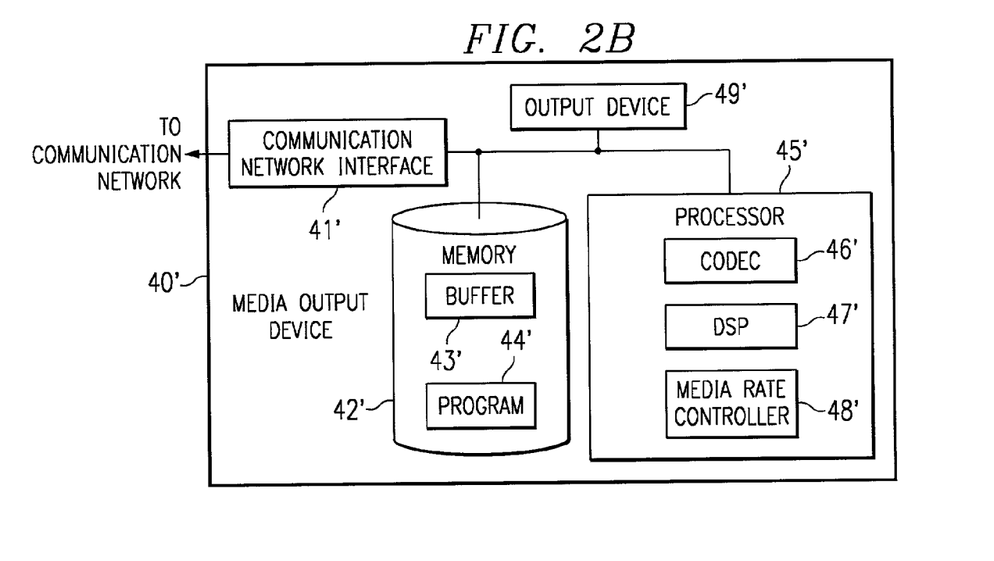
FIG. 2B shows a detailed view of another embodiment of a media output device for the system of FIG. 1.

FIG. 2B shows a detailed view of another embodiment of media output device 40, denoted 40', for communication system 10. In this embodiment, the processor of media output device 40 includes special purpose processors for handling some of the operations previously discussed. Like media output device 40, media output device 40' includes a communication network interface 41', a memory 42' having a buffer 43' and a program 44', and an output device 49'. These components may have configurations and operations similar to the corresponding components of media output device 40. Media output device 40', however, has a number of sub-processors—a coder/decoder (CODEC) 46', a DSP processor 47', and a media rate controller 48'—as part of a processor 45'. These sub-processors may handle some or all of the operations performed by processor 45 of media output device 40 and may be microprocessors, application specific integrated circuits, or any other type of device for manipulating electronic information.

For example, CODEC 46' may be responsible for converting the received media from a format suitable for storage to one suitable for output, such as, for example, converting the media from a digital to an analog format and/or decompressing the media. DSP processor 47' may be responsible for performing signal processing on the received media while still in its digital form, such as, for example, adjusting the audible sounds represented by the media based on the rate at which output is being generated based on the media. Media rate controller 48' may be responsible for adjusting the rate at which media should be delivered to media output device 40', such as, for example, by monitoring buffer 43' in memory 42'. Note, some or all of the operations of CODEC 46', DSP processor 47', and media rate controller 48' may be implemented by software controlling a general purpose processor, such as processor 45, in other embodiments or by other processors or devices.

Returning briefly to FIG. 1, in certain embodiments, gateway 50 may include a CODEC, a DSP processor, a media rate controller, and a buffer. In operation, the buffer would store the media received from media delivery system 30, the DSP processor would process the media based, at least in part, on the current rate at which output was being generated by media output device 70, the CODEC would convert the processed media from the encoded format into a format appropriate for media output device 70, and the media rate controller would monitor the buffer to determine whether the status of the media in the buffer was satisfactory. If the media rate controller determined that the status of the media in the buffer was unsatisfactory, the media rate controller would generate and send a command for media delivery system 30 to adjust the rate at which media was being delivered to gateway 50.

In a particular embodiment, media output device 70 may be able to signal gateway 50, by using either in-band or out-of-band signaling, that it desires to change the rate at which the media is being output. Upon receiving such a signal, the media rate controller of gateway 50 would send a command to media delivery system 30 to change the rate at which the media was being sent to the gateway 50 and also begin to process the received media to create a faster output for media output device 70. Note, however, that the rate at which information is delivered from gateway 50 to media output device 70 may be governed by the wire speed of PSTN 60. Thus, if media output device 70 desires to output media at a rate faster than the wire speed, gateway 50 may compensate for this, at least up to a point.

Figure 3:
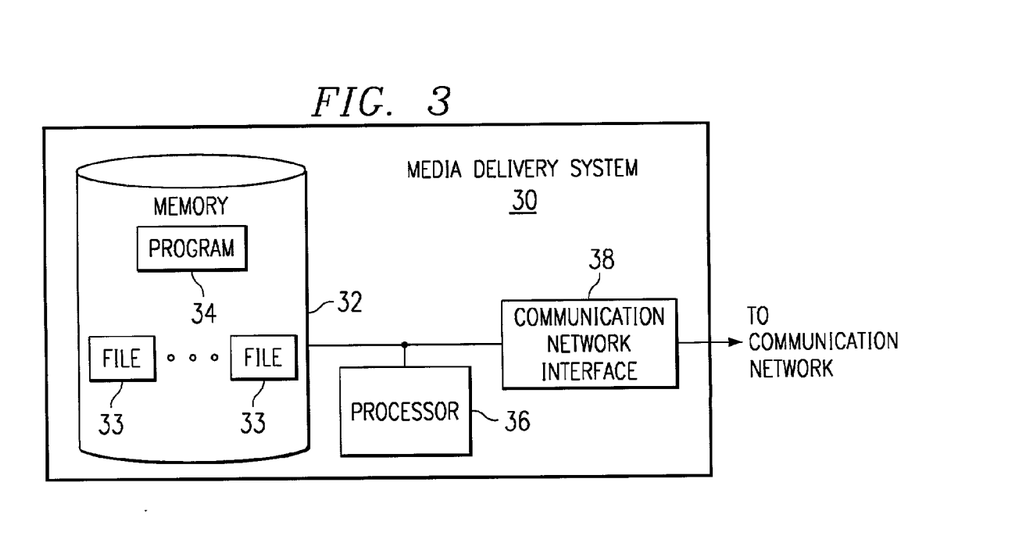
FIG. 3 shows a detailed view of one embodiment of a media delivery system for the system of FIG. 1.

FIG. 3 shows a detailed view of one embodiment of media delivery system 30 for communication system 10. In this embodiment, communication system 10 may be, for example, a voice mail system. It will be understood that in other embodiments, the media delivery system may be a video delivery system, a graphics delivery system, a text delivery system, or any other type of media delivery system. As illustrated, media delivery system 30 includes a memory 32, a processor 36, and a communication network interface 38. Communication network interface 38 is adapted to be coupled to communication network 20 and is operable to send information, including media, to and receive information from communication network 20. Memory 32 is coupled to communication network interface 38 and includes files 33 that each store a set of media. Memory 32 also includes a program 34 that contains a set of logic for processor 36. Processor 36 is also coupled to communication network interface 38 and is operable to retrieve media from one of files 33, format the retrieved media into packets for communication through communication network 20, and send the packets to communication network interface 38.

In operation, communication network interface 38 receives a request for media and sends the request to processor 36. Upon detecting the request, processor 36 determines if it has the capacity to handle the requested media delivery, if one of files 33 contains the requested media, and if the appropriate one of files 33 is available. If the appropriate one of files 33 is available and processor 36 is capable of handling the media delivery, processor 36 selects the appropriate one of files 33 and generates and sends a message through communication network interface 38 that media delivery is available. After determining the rate at which the media is to be delivered, processor 36 begins to sequentially retrieve portions of the selected file 33. The size of each retrieved portion of the selected file 33 and/or the rate at which the portions are retrieved depends on the specified media delivery rate. After obtaining a portion of the media from the selected file 33, processor 36 formats the media into packets for communication through communication network 20 and sends the packets to communication network interface 38. Processor 36 may continue to retrieve and packetize portions of the media in the selected file 33 until it receives instructions from media output device 40 to stop sending the media or until all of the media in the file 33 has been sent.

During another mode of operation, processor 36 receives a command indicating an adjustment to the rate at which the media is being delivered. The command may specify an increase in the rate, a decrease in the rate, a new rate, or any other type of adjustment to the current delivery rate. Upon receiving such a command, processor 36 adjusts the rate at which the media is being sent to communication network interface 38. Processor 36 may adjust this rate by placing a different amount of media of the selected file 33 into each packet and/or sending the packets at a different rate. For example, if the command from media output device 40 indicates that media should be delivered at a higher rate, processor 36 could include a greater amount of the media in the selected file 33 in each packet sent to communication network interface 38 while maintaining the rate at which the packets are sent to communication network interface 38. On the other hand, processor 36 could increase the rate at which it sends packets containing the media to communication network interface 38 while maintaining the amount of media in each packet constant. Of course, processor 36 could also increase the rate at which it sends the packets to communication network interface 38 and also increase the amount of media in each packet to increase the rate at which the media is delivered. Note, in particular embodiments, media output device 40 may itself decide how to adjust the rate at which the media is to be delivered, for example, deciding to increase the rate at which the packets are to be sent, and include this in the command to adjust the media delivery rate. Furthermore, in a particular embodiment, media output device 40 may inform media delivery system 30 when to deliver each packet containing media.

The components of media delivery system 30 may have a variety of different forms. Communication network interface 38 may be a network interface card, an optical transceiver, a radio frequency transceiver, or any other type of device that can send and receive information. Processor 36 may be a DSP, CISC, RISC, or any other type of device for manipulating electronic information. Memory 32 may be RAM, CD-ROM, or any other type of electromagnetic or optical volatile or non-volatile device for storing information. The media in files 33 may be representative of audible sounds, visual images, and/or any other type of information that can be output to a user. Other components, configurations, and distributions of operations for media delivery system 30 will be readily suggested to those skilled in the art.

In particular embodiments, memory 32 may include a file system or database storing a variety of media types in files 33. For example, some of files 33 may store digital representations of sound, and some of files 33 may store digital representations of video. The representations of sound may be in any format, such as, for example, G.711, G.723, G.729, or MP3, and the representations of video may be in any format, such as, for example, MPEG-2 or QuickTime. These files may be from several kilobytes in size to several gigabytes in size, for example.

In particular embodiments, processor 36 receives a request for media by DTMF signaling, selects one of files 33 based on parameters in the request, and begins to retrieve portions of the selected file 33. Processor 36 formats each portion into an Internet protocol (IP) packet. After forming each packet, processor 36 sends the IP packet to communication network interface 38 for delivery to communication network 20 and, subsequently, media output device 40. In some of these embodiments, processor 36 may actually encode the media into an appropriate format, such as G.711, before formatting each portion into an IP packet.

In still other embodiments, processor 36 and memory 32 do not have to be co-located, as illustrated in FIG. 3. In such embodiments, however, program 34 would probably not be a part of memory 32, but would be co-located with processor 36.

Figure 4A:
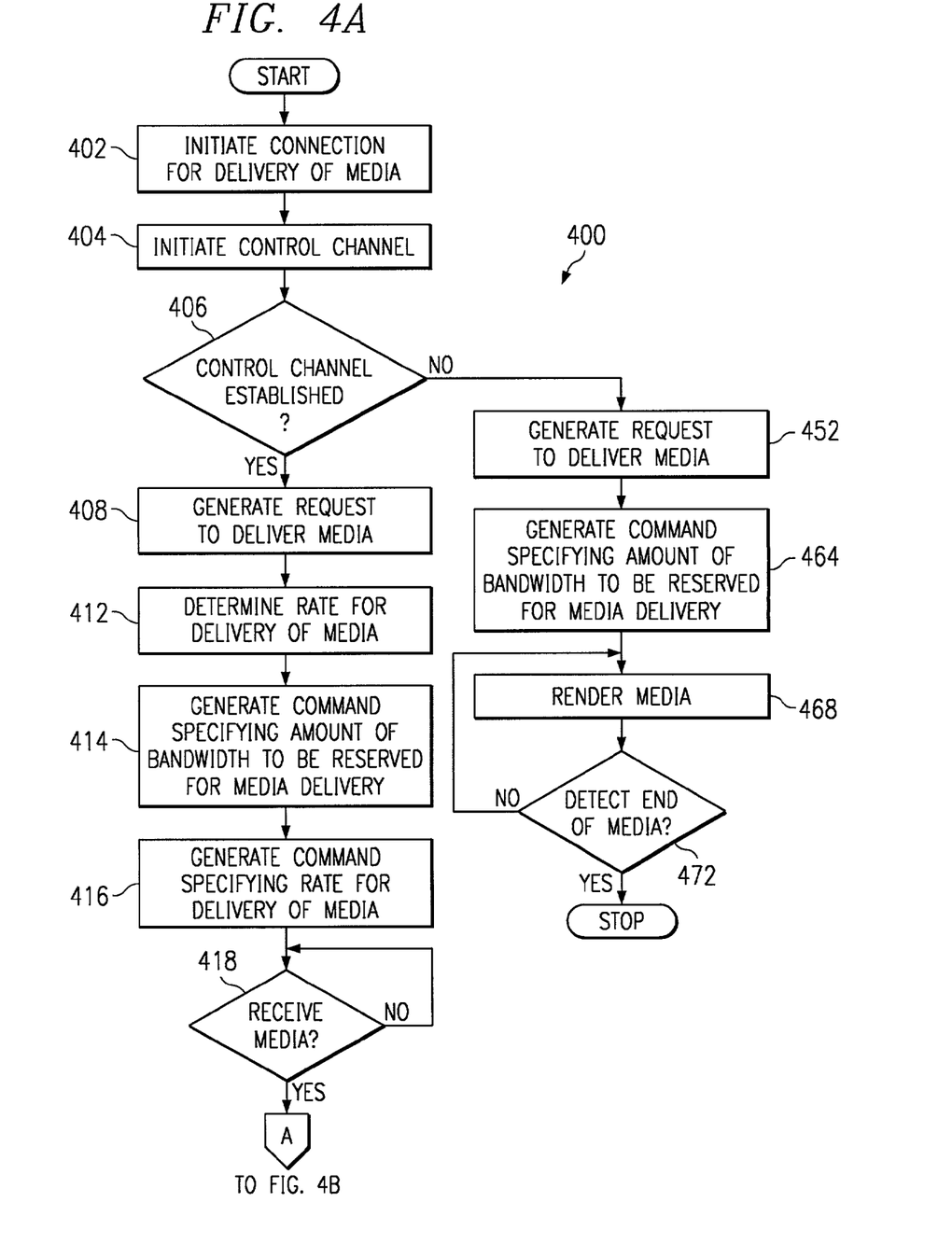
FIG. 4 is a flowchart showing one embodiment of the operation of a media output device in accordance with the present invention.
Figure 4B:
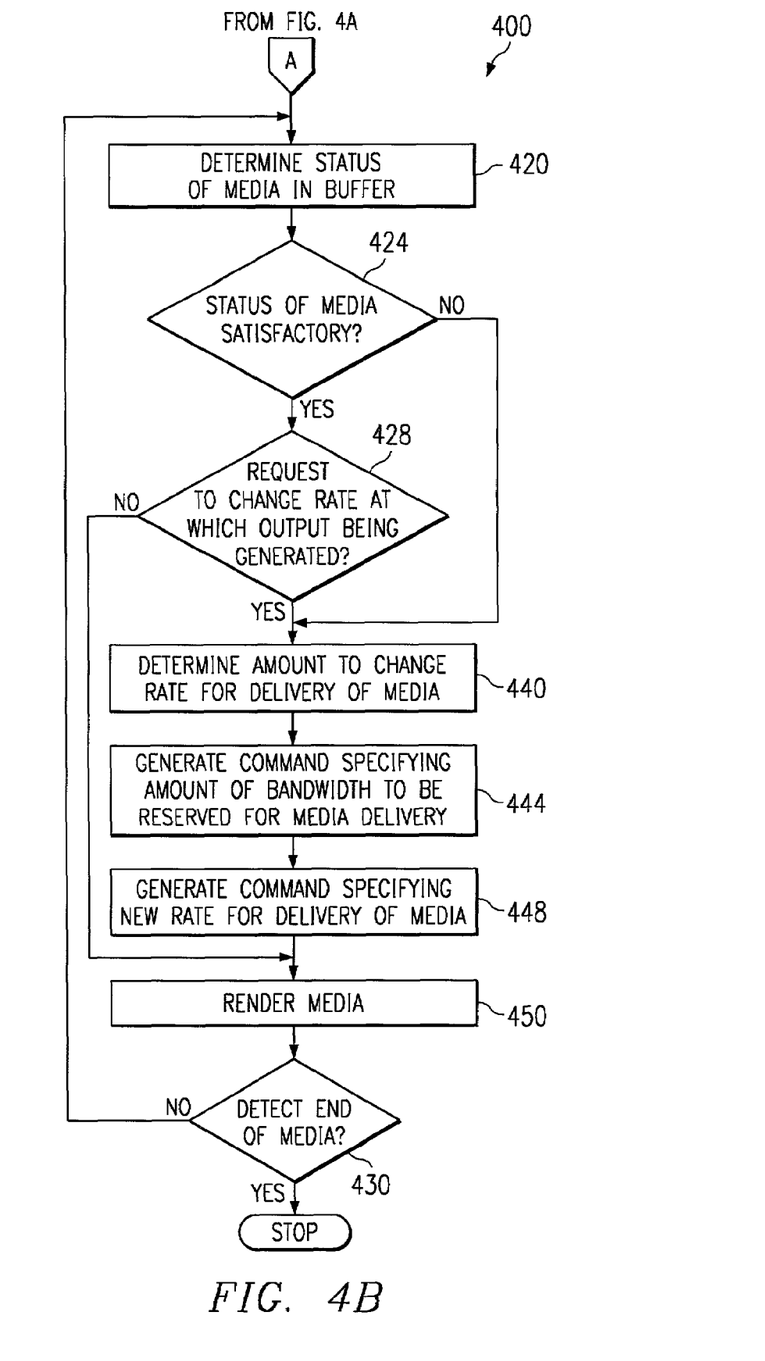

FIG. 4 illustrates a flowchart 400 showing one embodiment of the operation of a media output device, such as, for example, media output device 40, in accordance with the present invention. At function block 402, the media output device initiates a connection with a media delivery system, such as, for example, media delivery system 30, for delivery of media. In doing so, the media output device may determine the nature and functionality of the media delivery system. At function block 404, the media output device initiates a control channel to the media delivery system, and the media output device determines whether the control channel has been established at decision block 406.

If a control channel has been established, the media output device generates a request to deliver media, which is eventually received by the media delivery system, at function block 408. This request could include information specifying which media the media output device wants and/or any other type of initiation information. The media output device determines the rate at which the media is to be delivered at function block 412. In doing so, the media output device may, for example, determine the rate at which media is to be used in generating output. At function block 414, the media output device, based on the determined media delivery rate, generates a command specifying the amount of bandwidth to be reserved in a communication network. Note, for simplicity, the method illustrated by flowchart 400 assumes that the requested bandwidth is available in the communication network. At function block 416, the media output device generates a command specifying the rate at which the media is to be delivered to the media output device. This command is eventually received by the media delivery system, which then begins to deliver the media. The media output device waits to receive at least some of the media at decision block 418 before rendering it to the user.

Once the media output device begins to receive the media, it determines the status of the media in a buffer, such as, for example, buffer 43 of memory 42, at function block 420. The status of the media in the buffer could be based on the amount of media in the buffer, the rate that media is arriving in the buffer, the rate at which media is consumed from the buffer, or any other appropriate factor. The media output device determines whether the status of the media in the buffer is satisfactory at decision block 424. If the status of the media in the buffer is satisfactory, the media output device determines whether there has been a request to change the rate at which output is being generated based on the media, and, hence, the rate at which the media is being consumed by the media output device, at decision block 428. If there has been no request to change the rate at which output is being generated by the media output device, the media output device renders at least some of the currently received media at function block 450. The media output device determines whether the media delivery has ended at decision block 430. If the media output device detects this condition, it may stop checking the status of the media in the buffer, but if the media output device does not detect this condition, it returns to the beginning of the status checking sequence at function block 420.

If, however, the status of the media in the buffer is unsatisfactory at decision block 424, or if there has been a request to change the rate at which output is being generated by the media output device at decision block 428, the media output device proceeds to function block 440, where it determines the amount to change the media delivery rate. At function block 444, the media output device generates a command specifying the amount of bandwidth to be reserved in the communication network based on the change in the media delivery rate. Note again, for simplicity, the method illustrated by flowchart 400 assumes that the requested bandwidth is available in the communication network. The media output device generates a command specifying the new media delivery rate at function block 448. The media output device then renders at least some of the currently received media at function block 450 and determines whether it needs to continue checking the status of the media in the buffer at decision block 430.

Returning to decision block 406, if the media output device is not able to establish a control channel with the media delivery system, the media output device generates a request to deliver media at function block 452. Note, the inability to establish a control channel probably means that the media output device will not be able to adjust the media delivery rate, and will have to use one rate. In one embodiment, this rate will be the default rate of the media delivery system. At function block 464, the media output device generates a command specifying the amount of bandwidth to be reserved through a communication system for media delivery. Note, for simplicity, the method in flowchart 400 assumes that the requested media delivery rate is available in the communication network. At function block 468, the media output device renders at least some of the received media. At decision block 472, the media output device determines whether the media delivery is complete. If the media delivery is complete, the media output device may stop rendering the media, but if it is not complete, the media output device continues to render the media at it is received at function block 468.

As can be seen in flowchart 400, in this embodiment, the media output device can determine an initial media delivery rate and can adjust the media delivery rate, in response to a given set of conditions. The first condition is when the status of the media in the buffer is unsatisfactory, for example, either too little media or too much media, indicating that the media is being delivered either too slowly or too quickly, respectively. The second condition is when a command is received to change the rate at which output is being generated by the media output device, and, hence, the rate at which media is being consumed by the media output device. This could happen, for example, when a user of the media output device requests that the rate at which output is being generated be changed. Furthermore, the media output device is backward compatible with older media delivery systems because it may use a given rate if the media delivery system is not able to adjust rates.

In other embodiments, the media output device may have none, one, some, or all of these operations and/or additional operations. For example, in some embodiments, the media output device may only monitor the status of the media in the buffer to determine when to change the rate at which media is being delivered. As another example, in certain embodiments, the media output device may determine the functionality of the media delivery system to vary media delivery rates during the initial connection and, thus, may not have to rely on the establishment of a control channel to determine this functionality of the media delivery system. As a further example, in particular embodiments, the media output device may not have to reserve an amount of bandwidth in a communication network. As an additional example, in some embodiments, the media output device may determine how to adjust the rate at which the media is to be delivered. A variety of other operations and/or sequences of operations will be readily suggested to those skilled in the art. Furthermore, the operations may be distributed between a variety of components of the media output device.

Figure 5:
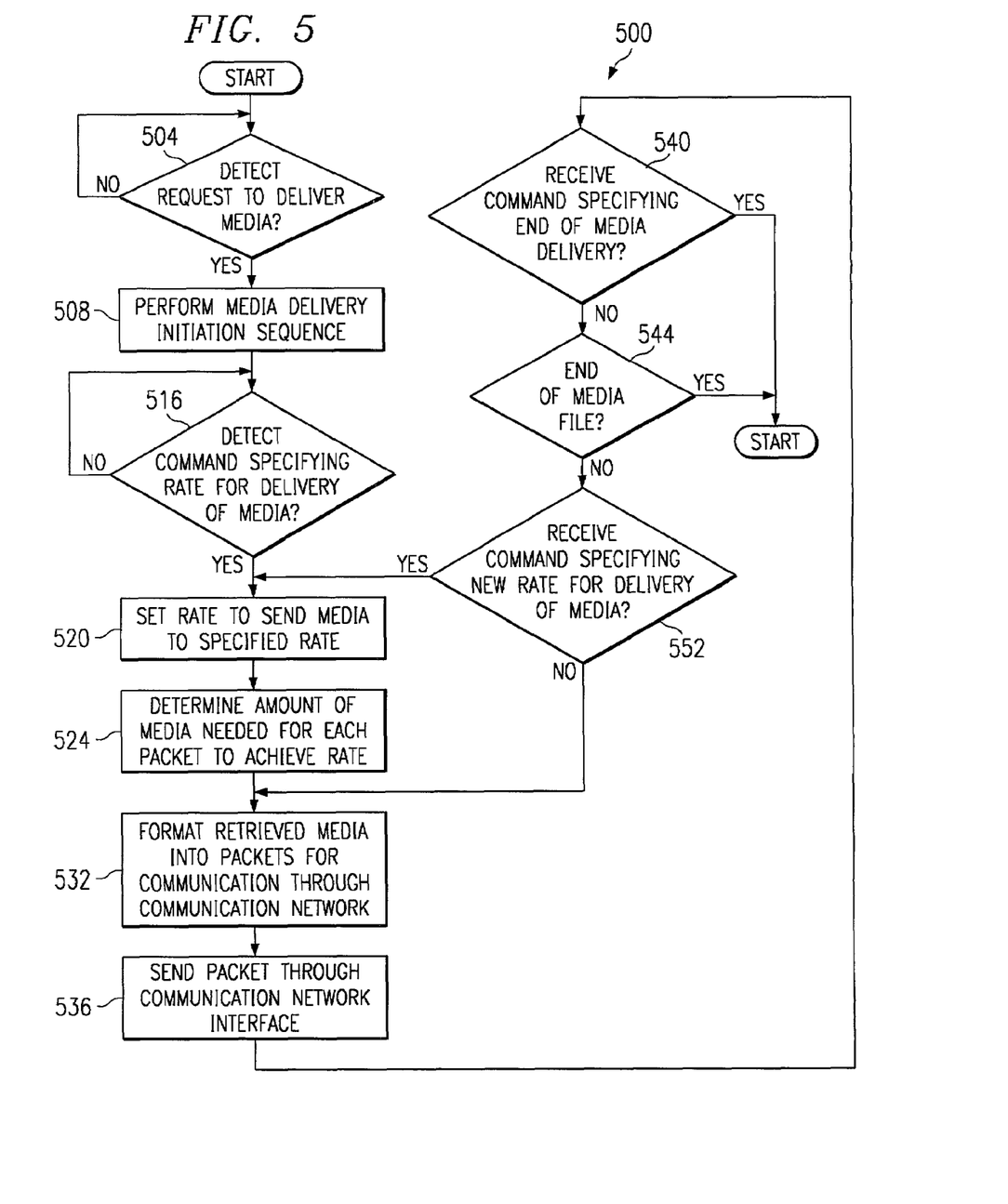
FIG. 5 is a flowchart showing one embodiment of the operation of a media delivery system in accordance with the present invention.

FIG. 5 is a flowchart 500 showing one embodiment of the operation of a media delivery system, such as, for example, media delivery system 30, in accordance with the present invention. At decision block 504, the media delivery system waits to receive a request to deliver media. Upon receiving such a request, the media delivery system performs an initiation sequence for the delivery of the media at function block 508. This sequence may include determining whether the file containing the requested media is available, selecting the file if it is available, and determining whether there are sufficient resources to handle sending the media. The media delivery system waits to receive a command specifying the rate at which to deliver the media at decision block 516. Once the media delivery system receives a command specifying the rate at which to deliver the media, the media delivery system sets the rate at which to send the media to the specified rate at function block 520. At function block 524, the media delivery system determines the amount of media needed for each packet to achieve the rate. The media delivery system retrieves and formats the appropriate amount of media into a packet for communication through a communication network at function block 532 and sends the packet through a communication network interface at function block 536. At decision block 540, the media delivery system determines whether it has received a command specifying the end of media delivery, which would probably be originated by the media output device. If the media delivery system has received such a command, delivery of the media is terminated.

If, however, the media delivery system has not received such a command, the media delivery system determines whether it is at the end of the media file at decision block 544. If the media delivery system determines that it is at the end of the media file, it terminates the media delivery. If, however, the media delivery system determines that it is not at the end of the media file, the media delivery system determines whether it has received a command specifying a new rate at which to deliver the media at decision block 552. The command may specify either a new rate or an adjustment to the current rate. If the media delivery system has not received such a command, the media delivery system formats and sends another packet containing an appropriate amount of media beginning at function block 532. If, however, the media delivery system has received such a command, the media delivery system sets the rate at which to send media to the newly specified rate at function block 520, determines the amount of media needed for each packet to achieve the new rate at function block 524, and formats and sends a packet containing the appropriate amount of media beginning at function block 532.

Although flowchart 500 illustrates a variety of operations for the media delivery system, in other embodiments, the media delivery system may have none, one, some, or all of these operations and/or additional operations. For example, in some embodiments, the media delivery system may not be able to autonomously determine the appropriate amount of media to place into each packet. In such a case, the amount would probably be in the command specifying the media delivery rate. As another example, in particular embodiments, the media output device may receive the command specifying the new rate at which to deliver the media and, in response, adjust the rate at which the packets are being sent to achieve the media delivery rate. As a further example, in certain embodiments, the media delivery system may adjust the rate at which the packets are being sent and adjust the amount of media in each packet to achieve the delivery rate. As an additional example, in some embodiments, the media delivery system may use a default media delivery rate to begin media delivery instead of waiting on a command specifying the initial media delivery rate. A variety of other sequences of operations and/or operations will be readily suggested to those skilled in the art. Moreover, the operations may be distributed between a variety of components of the media output device.

As discussed above, the present invention has several technical features and advantages. For example, in particular embodiments, the rate at which media is being delivered to a media output device is adjusted based on the rate at which a user of the media output device wants to have output generated based on the delivered media. Thus, a user of the media output device may adjust the rate at which she receives output based on the media without starving or overflowing the media output device. As another example, in certain embodiments, a buffer of a media output device is monitored to determine whether the amount of media available at the media output device is appropriate for generating output based on the media, and the media delivery rate is adjusted if the amount of media in the buffer is unsatisfactory. Thus, the media delivery rate is automatically adjusted to ensure that the media output device does not starve or overflow. As an additional example, in some embodiments, the rate at which the media is being delivered to the media output device is adjusted by changing the amount of media in each packet sent to the media output device and/or by changing the rate at which the packets are sent to the media output device. Thus, the adjustment of the rate at which media is delivered to the media output device may accommodate varying communication network conditions.

Although several embodiments of the present invention have been discussed, numerous additions, deletions, substitutions, and/or alterations to the invention may be readily suggested to one of skill in the art. It is intended therefore that the appended claims encompass such additions, deletions, substitutions, and/or alterations.

What is claimed is:

1. A Voice over Internet Protocol (VoIP) telephony device for controlling the delivery of streaming media, comprising:
   a communication network interface operable to receive streaming media from a network device external to the VoIP telephony device, the streaming media comprising a voice message received by the communication network interface at a first delivery rate;
   a memory coupled to the communication network interface, the memory operable to store media received through the communication network interface; and
   a media rate controller coupled to the memory and the communication network interface, the controller operable to:
      determine an adjustment to the first delivery rate and generate a command for transmission to the external network device, the command requesting a subsequent transmission of streaming media from the external network device to the VoIP telephony device to be delivered at an adjusted delivery rate based upon the adjustment to the first delivery rate; and
      determine whether to adjust the first delivery rate based on a status of the media in the memory.

2. The device of claim 1, wherein the communication network interface is an Ethernet card.

3. The device of claim 1, wherein the streaming media comprises voice over Internet protocol packets.

4. The device of claim 1, wherein the media rate controller is further operable to generate a command to reserve an amount of bandwidth in a communication network that is compatible with the adjusted delivery rate.

5. The device of claim 1, wherein the adjustment to the first delivery rate specifies a new rate for the delivery of the streaming media.

6. The device of claim 1, wherein the media rate controller generates a command for an increase in the first delivery rate when the amount of media in the memory is below a threshold.

7. The device of claim 1, wherein the media rate controller generates a command for a decrease in the first delivery rate when the amount of media in the memory is above a threshold.

8. The device of claim 1, further comprising:
   an output device interface coupled to the memory, the output device interface operable to receive the media and transform it into signals appropriate for output; and
   an output device coupled to the output device interface, the output device operable to receive the signals from the output device interface and generate output based on them.

9. The device of claim 8, further comprising an input device coupled to the media rate controller, the input device operable to detect a command to adjust the rate at which the media is being output by the output device, wherein the media rate controller is further operable to, based on the command, generate a command to adjust the rate at which the media is currently being delivered.

10. The device of claim 9, wherein the input device comprises one of a button, a speech recognition device, a graphical user interface, and a mouse.

11. The device of claim 8, wherein the output device comprises one of a speaker and a video terminal.

12. The device of claim 1, wherein the media rate controller is operable to determine whether the first delivery rate may be adjusted and to operate at only the first delivery rate if the first delivery rate may not be adjusted.

13. The system of claim 1, wherein:
   the network device is located at a physically remote location from the communication network interface; and
   the communication network interface is further operable to receive the streaming media over a communication network.

14. A Voice over Internet Protocol (VoIP) telephony device for controlling the delivery of streaming media, comprising:
   a network interface card operable to receive audio media from a network device external to the VoIP telephony device at different delivery rates;
   a random access memory coupled to the network interface card, the memory containing a buffer operable to store audio media received through the network interface card;
   a digital signal processor coupled to the memory, the digital signal processor operable to process the media in the buffer based on the rate at which output is being generated based on the media;
   a media rate controller coupled to the memory, the controller operable to monitor a status of the audio media in the buffer, to determine an adjustment to the current rate at which the audio media is being delivered based on the status of the audio media in the buffer, to generate a command for transmission to the external network device, the command requesting a subsequent transmission of streaming media from the external network device to the VoIP telephony device to be delivered at an adjusted delivery rate based upon the adjustment to the first delivery rate, and to determine whether to adjust the first delivery rate based on the status of the media in the memory;
   a coder/decoder coupled to the memory, the coder/decoder operable to convert the processed audio media into analog signals representative of audible sounds; and
   a speaker coupled to the coder/decoder, the speaker operable to receive the analog signals and generate audible sounds based on the analog signals.

15. A method for controlling the delivery of streaming media at a Voice over Internet Protocol (VoIP) telephony device, comprising:
   receiving streaming media at a VoIP telephony device at a first delivery rate, the streaming media received from a network device external to the VoIP telephony device;

storing the received media;

determining whether to adjust the first delivery rate;

using a media rate controller to determine an adjustment to the first delivery rate if an adjustment is desired;

using the media rate controller to generate a command for transmission to the external network device, the command requesting a subsequent transmission of streaming media from the external network device to the VoIP telephony device to be delivered at an adjusted delivery rate based upon the adjustment to the first delivery rate; and examining a status of the media being stored to determine whether to adjust the first delivery rate.

16. The method of claim 15, wherein the media comprises voice over Internet protocol packets.

17. The method of claim 15, further comprising generating a command to reserve an amount of bandwidth in a communication network that is compatible with the adjusted delivery rate.

18. The method of claim 15, wherein the adjusted delivery rate is greater than the first delivery rate if the amount of media being stored is below a threshold.

19. The method of claim 15, wherein the adjusted delivery rate is less than the first delivery rate if the amount of media being stored is above a threshold.

20. The method of claim 15, further comprising:

converting the received media into a form appropriate for output; and generating output based on the converted media.

21. The method of claim 20, wherein the output comprises one of audible sound and video graphics.

22. The method of claim 20, further comprising:

detecting a command to adjust the rate at which output is being generated based on the media;

determining an adjustment to the rate at which media is currently being delivered based on the command; and generating a command for the network device to adjust the current delivery rate in accordance with the adjustment.

23. The system of claim 15, further comprising transmitting the command to the network device to change the first delivery rate in accordance with the adjustment.

24. A set of logic encoded in media for controlling the delivery of streaming media, the logic operable to perform the following operations:

detect the reception of streaming media received from a network device external to a Voice over Internet Protocol (VoIP) telephony device, the streaming media received at a first delivery rate;

instruct a memory to store the received media;

determine whether to adjust the first delivery rate;

using a media rate controller to determine an adjustment to the first delivery rate if an adjustment is desired;

using the media rate controller to generate a command for transmission to the external network device, the command requesting a subsequent transmission of streaming media from the external network device to the VoIP telephony device to be delivered at an adjusted delivery rate based upon the adjustment to the first delivery rate; and examine a status of the media being stored to determine whether to adjust the first delivery rate.

25. The logic of claim 24, wherein the media comprises voice over Internet protocol packets.

26. The logic of claim 24, wherein the media represents audible sounds.

27. The logic of claim 24, wherein the logic is further operable to generate a command to reserve an amount of bandwidth in a communication network that is compatible with the adjusted delivery rate.

28. The logic of claim 24, wherein the adjusted delivery rate is greater than the first delivery rate if the amount of media being stored is below a threshold.

29. The logic of claim 24, wherein the adjusted delivery rate is less than the first delivery rate if the amount of media being stored is above a threshold.

30. The logic of claim 24, wherein the logic is further operable to:

convert the received media into a form appropriate for output; and facilitate the generation of output based on the converted media.

31. The logic of claim 30, wherein the output comprises audible sound or video graphics.

32. The logic of claim 24, wherein the logic is further operable to:

detect a command to adjust the rate at which output is being generated based on the media;

determine, based on the command, an adjustment to the rate at which media is currently being delivered; and generate a command for the network device to adjust the current delivery rate in accordance with the adjustment.

33. The logic of claim 24, wherein the logic is embedded in software.

34. A Voice over Internet Protocol (VoIP) telephony device for controlling the delivery of streaming media, comprising:

means for receiving streaming media at a VoIP telephony device at a first delivery rate, the streaming media received from a network device external to the VoIP telephony device;

means for storing the received media;

means for determining, at the VoIP telephony device, whether to adjust the first delivery rate and an adjustment to the first delivery rate if an adjustment is desired;

means for generating, at the VoIP telephony device, a command for transmission to the external network device, the command requesting a subsequent transmission of streaming media from the external network device to the VoIP telephony device to be delivered at an adjusted delivery rate based upon the adjustment to the first delivery rate; and means for examining the status of the media being stored to determine whether to adjust the first delivery rate.

35. The device of claim 34, wherein the media comprises voice over Internet protocol packets.

36. The device of claim 34, further comprising means for generating a command to reserve an amount of bandwidth in a communication network that is compatible with the adjusted delivery rate.

37. The device of claim 34, wherein the adjusted delivery rate is greater than the first delivery rate if the amount of media being stored is below a threshold.

38. The device of claim 34, wherein the adjusted delivery rate is less than the first delivery rate if the amount of media being stored is above a threshold.

39. The device of claim 34, further comprising:

means for converting the received media into a form appropriate for output; and means for generating output based on the converted media.

40. The device of claim 39, wherein the output comprises audible sound or video graphics.

41. The device of claim 39, further comprising:
means for detecting a command to adjust the rate at which output is being generated based on the media;
means for determining an adjustment to the rate at which media is currently being delivered based on the command; and
means for generating a command for the network device to adjust the current rate in accordance with the adjustment.

42. A system for delivering streaming media, comprising:
a communication network interface external to a Voice over Internet Protocol (VoIP) telephony device operable to send streaming media to a communication network for transmission to the VoIP telephony device;
a memory coupled to the communication network interface, the memory including at least one file containing media; and
a delivery controller coupled to the memory and the communication network interface, the delivery controller operable to:
receive a command from the VoIP telephony device, the command requesting the delivery controller to send the media through the communication network interface to the VoIP telephony device at an adjusted delivery rate,
retrieve the media from the file and format it into packets,
stream the packets through the communication network interface at the adjusted delivery rate; and
reserve an amount of bandwidth in a communication network that is compatible with the adjusted delivery rate.

43. The system of claim 42, wherein the communication network interface is an Ethernet card.

44. The system of claim 42, wherein the packets comprise voice over Internet protocol packets.

45. The system of claim 42, wherein the media represents audible sounds or video graphics.

46. The system of claim 42, wherein the delivery controller is further operable to stream subsequent media in the file through the communication network interface at an adjusted rate based on a command to adjust the rate.

47. The system of claim 46, wherein the adjusted rate is less than the previous rate.

48. The system of claim 46, wherein the controller streams subsequent media in the file through the communication network interface at the adjusted rate by adjusting the amount of media in each packet or adjusting the rate at which the packets are sent.

49. A system for delivering electronic media to a Voice over Internet Protocol (VoIP) telephony device, comprising:
a communication network;
a media output device in a VoIP telephony device, the media output device coupled to the communication network, the media output device operable to receive media from the communication network at a first delivery rate and generate output based on the media, the media output device further operable to determine an adjustment to the first delivery rate and generate a command requesting a subsequent transmission of media to be delivered at an adjusted delivery rate based upon the adjustment to the first delivery rate, the media output device further operable to generate a command to adjust the first delivery rate based on a status of the media in a buffer; and
a media delivery system coupled to the communication network and external to the media output device that is in the VoIP telephony device, the media delivery system operable to stream media destined for the media output device to the communication network at the first delivery rate, the media delivery system further operable to receive the command to adjust the first delivery rate and stream the subsequent transmission of media destined for the media output device to the communication network at the adjusted delivery rate.

50. The system of claim 49, wherein the media represents audible sounds or video graphics.

51. The system of claim 49, wherein the media output device comprises a telephone.

52. The system of claim 49, wherein the media output device determines the adjustment to the first delivery rate in response to receiving a command regarding the rate at which output is to be generated based on the media.

53. The system of claim 49, wherein the adjustment indicates an increase of the first delivery rate.

54. The system of claim 49, wherein the media output device is further operable to generate a command to reserve an amount of bandwidth in the communication network that is compatible with the adjusted delivery rate.

55. The system of claim 49, wherein the media is streamed in the form of voice over Internet protocol packets.

56. The system of claim 55, wherein the media delivery system adjusts the rate at which packets containing media are being streamed to the communication network to stream subsequent media to the communication network at the adjusted delivery rate.

57. A Voice over Internet Protocol (VoIP) telephony device for controlling the delivery of streaming media, comprising:
a communication network interface operable to receive streaming media from a network device external to the VoIP telephony device, the streaming media comprising a voice message received by the communication network interface at a first delivery rate;
a memory coupled to the communication network interface, the memory operable to store media received through the communication network interface; and
a media rate controller coupled to the memory and the communication network interface, the controller operable to:
determine an adjustment to the first delivery rate and generate a command for transmission to the external network device, the command requesting a subsequent transmission of streaming media from the external network device to the VoIP telephony device to be delivered at an adjusted delivery rate based upon the adjustment to the first delivery rate; and
generate a command to reserve an amount of bandwidth in a communication network that is compatible with the adjusted delivery rate.

58. A method for controlling the delivery of streaming media at a Voice over Internet Protocol (VoIP) telephony device, comprising:
receiving streaming media at a VoIP telephony device at a first delivery rate, the streaming media received from a network device external to the VoIP telephony device;
storing the received media;
determining whether to adjust the first delivery rate;
using a media rate controller to determine an adjustment to the first delivery rate if an adjustment is desired;
using the media rate controller to generate a command for transmission to the external network device, the command requesting a subsequent transmission of streaming media from the external network device to the VoIP telephony device to be delivered at an adjusted delivery rate based upon the adjustment to the first delivery rate; and generating a command to reserve an amount of bandwidth in a communication network that is compatible with the adjusted delivery rate.

59. A set of logic encoded in media for controlling the delivery of streaming media, the logic operable to perform the following operations:

detect the reception of streaming media received from a network device external to a Voice over Internet Protocol (VoIP) telephony device, the streaming media received at a first delivery rate;

instruct a memory to store the received media;

determine whether to adjust the first delivery rate;

using a media rate controller to determine an adjustment to the first delivery rate if an adjustment is desired;

using the media rate controller to generate a command for transmission to the external network device, the command requesting a subsequent transmission of streaming media from the external network device to the VoIP telephony device to be delivered at an adjusted delivery rate based upon the adjustment to the first delivery rate; and generate a command to reserve an amount of bandwidth in a communication network that is compatible with the adjusted delivery rate.

* * * * *